United States Patent [19]

Mehdorn

[11] Patent Number: 5,508,093

[45] Date of Patent: Apr. 16, 1996

[54] FUSIBLE FIBER BONDED LAYERED PRODUCT COMPRISING LAYERS OF CARRIER AND BINDER FIBERS

[75] Inventor: Frank Mehdorn, Berlin, Germany

[73] Assignee: Hoechst Aktiengesellschaft, Germany

[21] Appl. No.: 369,292

[22] Filed: Jan. 6, 1995

Related U.S. Application Data

[63] Continuation of Ser. No. 938,793, Sep. 1, 1992, abandoned.

[30] Foreign Application Priority Data

Sep. 3, 1991 [DE] Germany .................... 41 29 188.3

[51] Int. Cl.$^6$ .................... B32B 5/02; B32B 5/06; B32B 5/22; B32B 27/00
[52] U.S. Cl. .................... 428/219; 428/229; 428/233; 428/236; 428/239; 428/286; 428/298; 428/302; 428/373; 428/374; 428/902; 428/903
[58] Field of Search .................... 428/236, 233, 428/239, 246, 285, 286, 298, 302, 374, 373, 219, 229

[56] References Cited

U.S. PATENT DOCUMENTS

| | | | |
|---|---|---|---|
| 2,483,405 | 10/1949 | Francis | 154/54 |
| 4,555,811 | 12/1985 | Shimalla | 2/51 |
| 4,906,507 | 3/1990 | Grynaeus et al. | 428/113 |
| 5,108,827 | 4/1992 | Gessaer | 428/219 |
| 5,229,191 | 7/1993 | Austin | 428/198 |

FOREIGN PATENT DOCUMENTS

| | | |
|---|---|---|
| 0160609 | 12/1987 | European Pat. Off. . |
| 0414141 | 2/1991 | European Pat. Off. . |
| 0432120 | 6/1991 | European Pat. Off. . |
| 2346787 | 3/1975 | Germany . |
| 3417517 | 12/1984 | Germany . |
| 3941189 | 6/1990 | Germany . |
| 1517595 | 7/1978 | United Kingdom . |

*Primary Examiner*—James D. Withers
*Attorney, Agent, or Firm*—Connolly & Hutz

[57] ABSTRACT

A layered product having a first layer formed from at least one fusible binder consolidated nonwoven material, which first layer contains both carrier fibers and binder fibers. The layered product also contains a sheet material second layer which is adhered to the fusible binder consolidated nonwoven layer by an adhesive layer formed from melted binder fibers present in the surface of the nonwoven layer which faces the sheet material layer. The layered product of the invention is useful for manufacturing bituminized roofing and sealing webs.

24 Claims, 1 Drawing Sheet

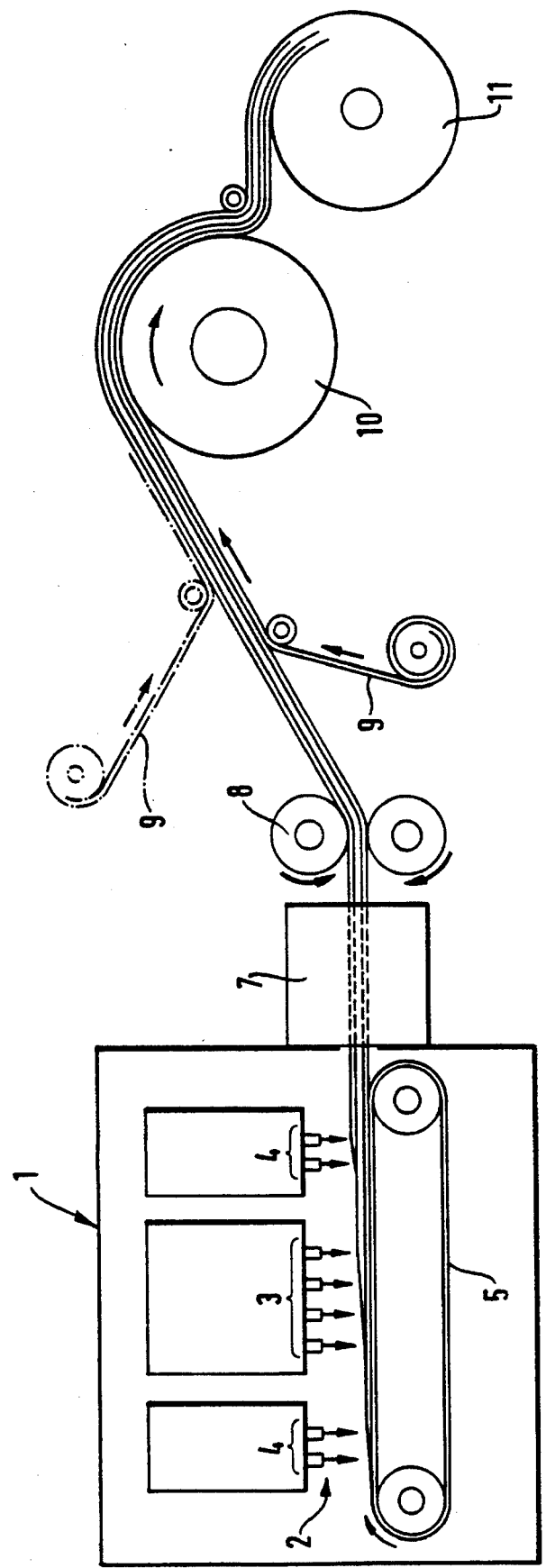

FUSIBLE FIBER BONDED LAYERED PRODUCT COMPRISING LAYERS OF CARRIER AND BINDER FIBERS

This application is a continuation of U.S. patent application Ser. No. 07/938,793, filed Sep. 01, 1992, now abandoned.

The present invention relates to a novel layered product comprising a specific nonwoven and a reinforcing layer, to an adapted process and selected intermediates for manufacturing it, and to the use of the layered product for manufacturing roofing and sealing webs.

Nonwovens, in particular spunbondeds, have long been used as carrier materials for roofing and sealing webs. However, in the manufacture and use of such webs it has been found that the resistance to the thermal stress of bituminization and the mechanical properties frequently leave something to be desired. There has therefore been no shortage of attempts to remedy these disadvantages of nonwovens.

For instance, nonwovens based on synthetic fibers have been combined with reinforcing fibers, for example with glass fibers. Examples of such sealing webs may be found in GB-A-1,517,595, DE-U-77-39,489, EP-A-160,609, EP-A-176,847 and EP-A-403,403. The bond between the fiber web and the reinforcing fibers is produced in this state of the art either by adhering by means of a binder or by needling the layers of different materials together.

DE-A-3,417,517 discloses a textile interlining having anisotropic properties and a process for manufacturing same. The interlining comprises a substrate with a surface that melts below 150° C. and secured thereto reinforcing filaments that melt above 180° C. and have been fixed to this surface in a parallel arrangement. In one embodiment, the substrate can be a nonwoven on whose surface there are situated hot melt adhesive fibers or filaments provided for adhering the parallel reinforcing fibers to the nonwoven.

DE-A-3,941,189 likewise discloses a combination of reinforcing fibers in the form of a warp with synthetic fiber nonwovens, securable to one another in various ways, including by the use of adhesive fibers. The combinations described, like the interlinings disclosed in DE-A-3,417,517, have anisotropic properties.

There is still a need for reinforced layered products which have an enhanced, ideally isotropic, strength and are useful in particular as carrier materials for manufacturing bituminized roofing and sealing webs which show improved resistance to the thermal stress of bituminization, have good flame resistance properties, exhibit ideally isotropic mechanical properties, for example tensile strengths, and whose weight specific tensile strength is distinctly above the values of corresponding conventional carrier materials.

Furthermore, practical experience with the bonding of nonwovens to textile sheet materials has shown that needling of the layers does in general cause damage to the individual fibers, so that the bond is not very strong. Similarly, adhering nonwovens to sheet materials, for example by calendering the unconsolidated structure, can give rise to problems. For instance, it is found that the individual layers can be damaged by the calendering pressure, so that these bonded structures are not very strong either.

It is an object of the present invention to develop layered products of enhanced isotropic strength which are free of the above-described disadvantages and which are suitable in particular for use as carrier materials for manufacturing roofing or sealing webs having the desired advantages.

This object is achieved by layered products having a first layer formed from at least one fusible binder consolidated nonwoven material, which first layer contains both on carrier fibers and binder fibers. The layered product also contains a sheet material layer which is adhered to the fusible binder consolidated nonwoven layer by an adhesive layer formed from melted binder fibers from the nonwoven layer surface which faces the sheet material. The layer surface which faces the sheet material has a major amount of binder fibers, which melt to form an adhesive layer of binder polymer between the nonwoven layer and sheet material layer.

The fusible binder consolidated nonwoven on which the layered product of the invention is based can be virtually any desired nonwoven as long as it contains carrier and binder fibers and at least one surface of this nonwoven has a layer composed chiefly of binder fibers, so that adhering to the reinforcing layer is possible there.

The nonwoven can be a staple fiber web, for example a carded web, or a nonwoven produced by other web forming techniques, for example by wet laying or by aerodynamic or hydrodynamic web formation. It is particularly advantageous to use spunbonded webs (spunbondeds).

The nonwoven contains carrier fibers and binder fibers. The relative proportions between the two types of fiber can be varied within wide limits, although care must be taken to ensure that the proportion of binder fibers is sufficient for obtaining adequate strength for the desired application of the nonwoven as a result of the carrier fibers being bonded together by the binder fibers and that the proportion of binder fibers at least one surface is sufficient for achieving a sufficiently firm bond to the reinforcing sheet material for the desired application.

The proportion of binder fiber in the nonwoven is customarily less than 50% by weight, based on the weight of the nonwoven.

The carrier and binder fibers can be derived from any desired thermoplastic fiber forming polymers. Carrier fibers may in addition also be derived from infusible fiber forming polymers. Examples of polymers from which the carrier fibers may be derived are polyacrylonitrile, polyolefins, such as polyethylene, essentially aliphatic polyamides, such as nylon-6,6, essentially aromatic polyamides (aramids), such as poly(p-phenylene terephthaiate), or copolymers containing a proportion of aromatic m-diamine units to improve the solubility, or poly(m-phenylene isophthalate), essentially aromatic polyesters, such as poly(p-hydroxybenzoate), or preferably essentially aliphatic polyesters, such as polyethylene terephthalate.

The binder fibers are in general selected on the basis that they will melt at a temperature at which the essential proportion of the given carrier fibers in a particular case will not melt and/or become thermoplastically deformed. In general, the binder fiber melting point is more than 10° C. below the carrier fiber melting point.

Examples of polymers from which the binder fibers can be derived are polyolefins, such as polyethylene, essentially aliphatic polyamides, such as nylon-6,6, or preferably essentially aliphatic polyesters, such as polyethylene terephthalate, in particular modified polyethylene terephthalate or polybutylene terephthalate.

The carrier and binder fiber linear densities can be chosen from within wide limits. Examples of customary fiber linear densities are from 1 to 16 dtex, preferably from 2 to 6 dtex.

The basis weight of the nonwoven is customarily within the range of about 20–400 g/m$^2$, preferably 100–200 g/m$^2$.

The basis weight of the layered product is customarily from 100 to 450 g/m², in particular from 120 to 250 g/m².

The filament or staple fibers of which the nonwovens are composed can have a virtually round cross section or else other cross sections, such as dumbbell, kidney, triangular or tri- or multilobal cross sections. It is also possible to use hollow fibers.

Furthermore, the binder fiber can be used in the form of bi- or multicomponent fibers, in which case the binder component makes up at least some of the fiber surface.

Particular preference is given to using nonwovens based on polyester fibers, in particular polyester spunbondeds.

The basis weight of such polyester spunbondeds is preferably between 20 and 400 g/m² and the filament linear density between 1 and 16 dtex. The carrier fibers are preferably made of polyethylene terephthalate. In particular, at least the carrier filaments can be made of polyesters modified to be flame resistant as described for example in U.S. Pat. No. 3,941,752.

DE 2,526,749 discloses the preparation of a flame resistant polybutylene terephthalate which comprises the transesterification of dimethyl terephthalate with 1,4-butane diol in the presence of a titanium catalyst, followed by the addition of 3 to 20 mole %, based on the total acid component, of a phosphorus containing compound. Before addition of the phosphorus compound, the transesterification product is heated for 5 to 90 minutes at 180° to 250° C. under a vacuum of 25–250 mm of mercury and an additional polycondensation catalyst is added, consisting of 0.01–0.2 wt. % of $Sb_2O_3$ and 0.0025–0.16 wt. % basic alkali or alkaline earth compound.

EP-A-432,620 discloses a flame-retardant spun-bonded fabric consisting of matrix filaments and polyester binder filaments acting as a melt binder. The melt binder is a modified polyethylene terephthalate with flame retardant properties.

The modified polyethylene terephthalate has a unit weight above 50 g/m², the filaments of the matrix and melt binder have a titre of between 1–10 dtex, the proportion of polyester binder filaments is not above 20 wt. %, and the matrix filaments also contain polyethylene terephthalate.

The polyester in the binder filaments has phosphorus containing units condensed in the polymer chain and consists of a dicarboxylic acid and diol component and units of the formula —O—P(O)($R_1$)—R—CO, which make up 3–20 mol. % of the acid component (when R is a saturated open chain or cyclic alkylene, arylene or aralkylene, $R_1$=1–6C alkyl, aryl or aralkyl), and the fabric can contain an antistatic additive.

The binder filaments of these preferred spunbondeds are preferably made of modified polyethylene terephthalate having an appropriately lowered melting point, for example of isophthalic acid modified polyethylene terephthalate, or of polybutylene terephthalate.

The filaments forming the spunbonded may be modified with customary additives, for example antistats, such as carbon black.

Particularly preferred nonwovens for manufacturing the layered product of the invention are fusible binder consolidated spunbondeds comprising load carrying filaments and fusible binder filaments that are made of polyester, that have at least one adhesive surface layer as per the above definition and whose basis weight is within the range between 20 and 120 g/m², in particular between 30 and 90 g/m², whose load carrying filaments and binder filaments have linear densities between 1 and 7 dtex, in particular between 1 and 4 dtex, and whose binder filaments account for a proportion of less than 50% by weight of the spunbonded.

Particularly preferred nonwovens for manufacturing the layered product of the invention are fusible binder consolidated spunbondeds of the above described type wherein the load carrying filaments and the binder filaments are made of polyesters modified to be flame resistant.

Nonwovens of this type are known per se from U.S. Pat. No. 5,173,355.

Further particularly preferred nonwovens for manufacturing the layered product of the invention are fusible binder consolidated spunbondeds comprising load carrying filaments and fusible binder filaments that have at least one adhesive surface layer as per the above definition and that have binder filaments whose melting point is less than 30° C., preferably between 10° and 20° C., below the melting point of the load carrying filaments, and in which the load carrying filaments and the binder filaments are preferably polyester fibers.

Further particularly preferred nonwovens for manufacturing the layered product of the invention are fusible binder consolidated spunbondeds comprising load carrying filaments and fusible binder filaments that have at least one adhesive surface layer as per the above definition and that contain binder filaments made of polyester, especially polyester modified to be flame resistant, in particular polyethylene terephthalate with flame resistant properties. The binder fibers are preferably made of polyesters containing phosphorus-containing chain members as cocondensed units.

Nonwovens of this type are known per se from as discussed previously.

Further particularly preferred nonwovens for manufacturing the layered product of the invention are polyester based fusible binder consolidated nonwovens comprising load carrying filaments and fusible binder filaments that have at least one adhesive surface layer as per the above definition and wherein the binder filaments are made of polybutylene terephthalate.

Nonwovens of this type are known per se from DE-A-3,419,675.

The sheet material to be combined with the nonwoven can be produced by virtually any technique for creating sheetlike structures. For the purposes of the present invention the term "sheet material" is to be understood as meaning a sheetlike structure which is self supporting and can be handled as such (in contradistinction to warps). The sheet material can be reinforced by nonwoven with which it is to be combined; preferably, however, it serves to reinforce the nonwoven. Examples of suitable sheet materials are films, foils, sheeting, weaves, knits and in particular nonwovens. The sheet materials are preferably made of fiber materials.

Suitable materials for producing these sheet materials are all low or non flammable materials that can be processed into that sheetlike form. Examples of such materials are metals, in particular aluminum, and fiber forming organic or inorganic materials, such as fibers made of aromatic polyamides, of carbon or in particular of glass.

A sheet material chosen as reinforcement will have a higher dimensional stability than the nonwoven used.

The layered products of the invention are customarily manufactured by separately producing the individual layers, subsequently combining these layers and then adhering the layers together by heating with or without pressure so that the binder fibers melt virtually completely at the surface of the nonwoven and enter a bond with the adjoining surface of the sheet material. The manufacturing process will be described with reference to layered products containing spunbondeds. It can be employed analogously for manufacturing layered products based on other nonwovens by replacing the spunbonded with, for example, card webs.

The invention also relates to the manufacture of the layered product of the invention.

The layered products of the invention can be used for manufacturing bituminized roofing and sealing webs. This is likewise part of the subject matter of the present invention. For this end the carrier material is conventionally treated with bitumen and then if desired besprinkled with a granular material, for example with sand. The roofing and sealing webs thus produced are notable for good isotropic strength values and for good flame resistance.

The invention further provides selected fusible binder consolidated nonwovens which can be used for manufacturing the layered products of the invention. These nonwovens are characterized by the presence of at least three alternate layers in which said carrier fibers or said binder fibers predominate, although at least one surface of the nonwovens is formed by a chiefly binder fiber layer which has been partially melted.

The manufacture of the layered products of the invention will now be more particularly described by way of example with reference to the FIGURE.

A conventional web former (1) is used to produce a spunbonded according to the invention. This is done as shown in FIG. 1 by spinning molten polymer from a plurality of successive rows of nozzles (2). These individual rows of nozzles or groups (3, 4) of nozzle rows are alternately charged with polymers which will form the carrier fiber and the binder fibers. The as spun polymer streams are conventionally drawn and, for example using a rotating impact plate, laid down in a sprinkle texture on a conveyor belt (5). This arrangement of nozzles produces a primary spunbonded composed of different layers in which either the binder fibers or the carrier fibers predominate. According to FIG. 1, the first and last rows of the nozzle arrangement, viewed in web formation direction, are charged with binder polymer, so that the primary web produced has mainly binder fibers not only on its top surface but also on its bottom surface.

The primary web thus produced is then thermally preconsolidated in a conventional manner by treating it for example in a preconsolidator (7) with a hot roll so that at least some of the binder fibers melt, which consolidates the primary web to such an extent that it can be handled without the conveyor belt. This form of preconsolidation is described for example in DE Patent 3,322,936. Thereafter the preconsolidated web is treated in an intermediate consolidator (8) wherein the binder fibers are melted at an elevated temperature with or without pressure to such an extent that they mostly lose their coherent fiber structure. This step is preferably carried out by calendering the preconsolidated primary web.

Thereafter the sheet material (9), for example a glass fiber nonwoven, is added and brought into contact with that side of the end consolidated spunbonded at whose surface there is a layer of incipiently or fully melted binder polymer. The sheet material (9) can be added from one or both of the sides.

Thereafter the combination of spunbonded and sheet material is adhered together by application of elevated temperature with or without pressure. This can be done for example in a hot air oven or preferably on a sieve drum fixer (10) within which the temperature is set sufficiently high for the melting point of the binder polymer to be exceeded, so that it forms an adhesive layer between the spunbonded and the sheet material. The ready produced layered product is then wound up in a conventional manner (11).

The above described process can be varied in many ways without departing from the basic concept of the present invention. For instance, different sequences of carrier and binder polymers can be used to produce differently layered spunbondeds. Similarly, instead of the sheet material (9) it is conceivable to use a layered product formed from a nonwoven and a sheet material applied to one side so as to form a sandwich structure. It is also readily possible to use more than two types of polymer in the production of the nonwoven or to use the binder fibers in the form of bi- or multicomponent fibers. Furthermore, the process described can also be carried out in separate steps, for example by interrupting it following the end consolidation of the spunbonded and carrying out the combining with the sheet material (9) and the adhering together of the layers in a separate operation.

What is claimed is:

1. A layered product comprising:
   at least one reinforcing sheet material layer,
   at least one fusible binder consolidated nonwoven layer containing binder and carrier fibers, and having at least one surface facing said at least one reinforcing sheet material layer, wherein said fusible binder consolidated nonwoven layer is multilayered and contains at least one layer having a major portion of continuous carrier fibers and at least one layer having a major portion of binder fibers, and the surface facing said at least one reinforcing sheet material layer is a layer having a major portion of binder fibers, and
   an adhesive layer between said sheet material layer and said nonwoven layer, the adhesive layer being formed from melted binder fibers on the surface of said fusible binder consolidated nonwoven which faces the surface of the sheet material,
   wherein said carrier and binder fibers have linear densities from 1 to 16 dtex, and the basis weight of the layered product is from 100 to 450 g/m$^2$, rendering said layered product suitable for use as a construction material.

2. The layered product of claim 1 wherein the reinforcing layer is based on a low or non flammable material.

3. The layered product of claim 1 wherein the nonwoven is a spunbonded.

4. The layered product of claim 1 wherein the reinforcing sheet material is a woven material, a knit or a nonwoven material.

5. The layered product of claim 2 wherein the low or non flammable material is a metal or a fiber forming organic or inorganic material.

6. The layered product of claim 5 wherein the metal is aluminium.

7. The layered product of claim 5 wherein the low or non flammable material is in fiber form and comprises a high modulus fiber material.

8. The layered product of claim 7, wherein the fiber material contains aromatic polyamides, carbon or glass.

9. The layered product of claim 7 wherein the low or non flammable material comprises glass fibers.

10. The layered product of claim 1 in sandwich form wherein the sheet material is situated between two fusible binder consolidated nonwovens with an adhesive layer between the sheet material and a nonwoven on either side.

11. The layered product of claim 1 in sandwich form wherein the layer of fusible binder consolidated nonwoven is situated between two sheet materials with an adhesive layer between the sheet material and the nonwoven on either side.

12. The layered product of claim 1 wherein the carrier fibers of the fusible binder consolidated nonwoven are made of polyester.

13. The layered product of claim 12 wherein the polyester is polyethylene terephthalate.

14. The layered product of claim 1 wherein the fiber fibers of the fusible binder consolidated nonwoven are bicomponent fibers of the side-by-side type or of the core-sheath type in which the higher melting component is made of polyester, and the lower melting component is made of lower melting polyester or of polyolefins.

15. The layered product of claim 14 wherein the bicomponent fiber is of the core-sheath type, the core is made of polyethylene terephthalate and the sheath is made of lower melting polyethylene terephthalate or of polybutylene terephthalate.

16. A fusible binder consolidated nonwoven based on carrier fibers which are made of polyethylene terephthalate and binder fibers made of a lower melting polyethylene terephthalate or polybutylene terephthalate comprising:

at least three layers of which the center layer contains a major portion of continuous carrier fibers, and the two surrounding layers contain a major portion of binder fibers, wherein said carrier and binder fibers have linear densities from 1 to 16 dtex, and the basis weight of the layered product is from 20 to 400 gm$^2$, rendering said layered product suitable for use as a construction material.

17. The fusible binder consolidated nonwoven of claim 16 comprising three layers, the two outer layers of which are formed chiefly of binder fibers and the interlayer mainly of carrier fibers.

18. The fusible binder consolidated nonwoven of claim 16 comprising from five to seven layers, one or both surface layers being formed of a layer containing mainly binder fibers, 19. A layered product comprising:

at least one reinforcing sheet material layer, at least one fusible binder consolidated nonwoven layer containing binder and carrier fibers, and having at least one surface facing said at least one reinforcing sheet material layer, wherein said fusible binder consolidated nonwoven layer is multilayered and contains at least one layer having a major portion of continuous carrier fibers and at least one layer having a major portion of binder fibers, and the surface facing said at least one reinforcing sheet material layer is a layer having a major portion of binder fibers, and an adhesive layer between said sheet material layer and said nonwoven layer, the adhesive layer being formed from melted binder fibers on the surface of said fusible binder consolidated nonwoven which faces the surface of the sheet material, wherein said carrier and binder fibers have linear densities from 1 to 16 dtex, and the basis weight of the layered product is from 100 to 450 g/m$^2$, rendering said layered product suitable for use as a construction material, and the at least one reinforcing layer is a low or non flammable material selected from the group consisting of metals, fiber forming organic materials, and fiber forming inorganic materials.

20. A product as claimed in claim 19, wherein the reinforcing layer is aluminum.

21. A product as claimed in claim 19, wherein the reinforcing layer is a high modulus fiber material.

22. A product as claimed in claim 19, wherein the fiber forming inorganic material is carbon or glass.

23. A product as claimed in claim 19, wherein the reinforcing layer is glass fibers.

24. A product as claimed in claim 19, wherein the fiber forming inorganic material is an aromatic copolyamide.

* * * * *